(12) United States Patent
Cathey et al.

(10) Patent No.: US 10,120,659 B2
(45) Date of Patent: Nov. 6, 2018

(54) ADAPTIVE USER INTERFACES

(71) Applicant: Apple Inc., Cupertino, CA (US)

(72) Inventors: Kevin Cathey, San Jose, CA (US); Maxwell Oliver Drukman, San Francisco, CA (US); Antonio Ricciardi, Palo Alto, CA (US); Jonathan Joseph Hess, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 524 days.

(21) Appl. No.: 14/503,139

(22) Filed: Sep. 30, 2014

(65) Prior Publication Data

US 2015/0347097 A1 Dec. 3, 2015

Related U.S. Application Data

(60) Provisional application No. 62/005,991, filed on May 30, 2014.

(51) Int. Cl.
*G06F 3/048* (2013.01)
*G06F 8/38* (2018.01)
*G06F 3/0484* (2013.01)
*G06F 3/0481* (2013.01)

(52) U.S. Cl.
CPC .............. *G06F 8/38* (2013.01); *G06F 3/0481* (2013.01); *G06F 3/0484* (2013.01); *G06F 2203/04803* (2013.01)

(58) Field of Classification Search
CPC ........................................................ G06F 8/38
See application file for complete search history.

(56) References Cited

U.S. PATENT DOCUMENTS

| | | | |
|---|---|---|---|
| 5,651,108 A * | 7/1997 | Cain | G06F 8/34 715/763 |
| 5,796,401 A | 8/1998 | Winer | |
| 7,030,890 B1* | 4/2006 | Jouet | G06F 9/4443 345/589 |
| 7,246,326 B2 | 7/2007 | Haley | |
| 2008/0211779 A1* | 9/2008 | Pryor | G01C 21/3664 345/173 |
| 2013/0050270 A1 | 2/2013 | Joo | |
| 2013/0222434 A1 | 8/2013 | Park et al. | |
| 2013/0263280 A1* | 10/2013 | Cote | G06F 21/62 726/26 |
| 2014/0101573 A1* | 4/2014 | Kuo | G06F 17/30905 715/760 |

(Continued)

*Primary Examiner* — Joy M Weber
(74) *Attorney, Agent, or Firm* — Womble Bond Dickinson (US) LLP

(57) ABSTRACT

Described is a technique for creating and displaying adaptive user interfaces. The user interface may be provided to an application development environment that provides the ability to allow authoring of a user interface that adapts to a screen size with any first abstracted size class value and any second abstracted size class value. Accordingly, an application that includes the user interface may determine a screen size of a device and adapt the user interface according to the screen size including the first abstracted size clasp value and the second abstracted size class value. Thus, a developer may efficiently develop a user interface based on various abstracted size class values that may be adapted to a particular device.

21 Claims, 7 Drawing Sheets

(56) References Cited

U.S. PATENT DOCUMENTS

2014/0108970 A1   4/2014  Syu et al.
2014/0195940 A1*  7/2014  Ogiso ................ G06F 3/04845
                                                    715/765

* cited by examiner

ADAPTIVE USER INTERFACES

CROSS-REFERENCE TO RELATED APPLICATIONS

This application claims priority to U.S. Provisional Patent Application No. 62/005,991, filed on May 30, 2014, entitled "ADAPTIVE USER INTERFACES," the content of which is incorporated herein by reference in its entirety.

TECHNICAL FIELD

The disclosed technology pertains to authoring user interfaces in an application development environment for electronic devices.

BACKGROUND

Current application development tools require a developer to design separate user interfaces for each orientation of each physical screen size that an application can be displayed on. For example, if a developer wants to create an application that can be displayed on a first smartphone device, a second smartphone device, a first mobile tablet device, and a second mobile tablet device, the developer must create four separate user interface flows for each orientation of each device. Then if the developer later wants to introduce changes to the user interface across all devices, the developer must manually and separately apply the changes to each of the user interface workflows. Thus there exists a need for more advanced development tools that simplify the creation and editing of user interfaces that are designed to appear on multiple screen sizes and in multiple orientations. As the number of screen sizes on which an application can appear increases, the need for such improved development tools becomes exponentially greater as well.

SUMMARY

Disclosed are systems, methods, and computer-readable storage media for creating and editing adaptive user interfaces for electronic devices. An example method includes receiving a user interface by an application development environment, the application development environment providing the ability to allow authoring of a user interface that adapts to a screen size with any first abstracted size class value and any second abstracted size class value. The method then includes creating an application including the user interface wherein the application is configured to: determine a screen size of a device, the screen size including a first abstracted size class value and a second abstracted size class value, adapt the user interface according to the screen size including the first abstracted size class value and the second abstracted size class value, and display the adapted user interface on the device. In one implementation, the application is configured to determine the screen size of the device by determining a device classification for the device. Example abstracted size class values can include compact, regular, and wide values. In one implementation these compact, regular and wide values are known as abstracted dimensional components. Other variables that further define device features are possible such as variables representing devices with certain input capabilities, such as an HDMI input or a primary display that is touch-capable. These variables can be represented with a value of (true, false). Other examples of variables that can be used to customize the user interface are "device orientation" which can be represented with a value corresponding to (horizontal, vertical) and display orientation which can be represented with a value corresponding to (portrait, landscape).

The example method can further include creating instructions to override the displayed user interface with a modified user interface wherein the determined screen size of the device includes a first predetermined abstracted size class value.

In one implementation of the example method, the instructions to override the adapted user interface with the modified user interface include instructions to change color, text, element location, or removing of an element.

In another implementation of the example method, the user interface includes a multi-pane interface and the override instructions only apply to one pane within the multi-pane interface.

In another implementation of the example method, the first abstracted size class value or the second abstracted size class value is defined as a compact or regular abstracted size class value.

In another implementation of the example method the first abstracted size class value is a width of the screen size of the device and the second abstracted size class value is a height of the screen size of the device.

In another implementation of the example method, the first abstracted size class value and second abstracted size class value define a circular screen size.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for convenient and simple creation and editing of adaptive user interfaces for electronic devices. The disclosure now turns to FIG. 1.

Figure 1:
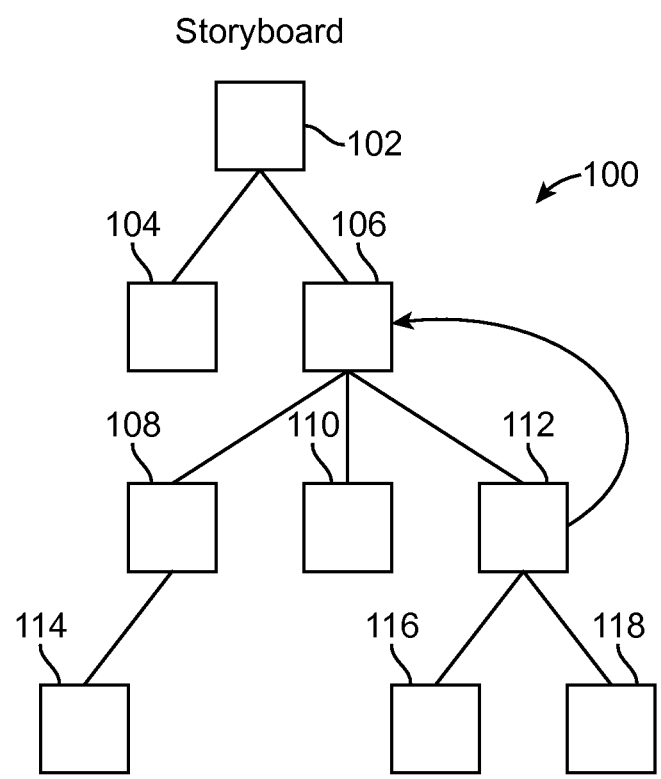
FIG. 1 illustrates an example user interface workflow for a given screen size.

FIG. 1 illustrates an example user interface workflow for a given screen size. FIG. 1 includes storyboard workflow 100. Storyboard workflow 100 includes interface 102, interface 104, interface 106, interface 108, interface 110, interface 112, interface 114, interface 116, and interface 118. Current application development tools require a developer to design separate user interfaces and user interface workflows for each physical screen size that an application can be displayed on. For example, if a developer wants to create an application that can be displayed on a first smartphone device, a second smartphone device, a first mobile tablet device, and a second mobile tablet device, the developer must create four separate user interface workflows for each device. Therefore, the developer would have to create a separate storyboard workflow, such as storyboard workflow 100, for each of the four devices Additionally, if the developer later wants to introduce changes to the user interface across all devices, the developer must manually and separately apply the changes to each of the user interface workflows. Thus, as described above, there exists a need for more advanced development tools that simplify the creation and editing of user interfaces that are designed to appear on multiple screen sizes. As the number of screen sizes on which an application can appear increases, the need for such improved development tools becomes exponentially greater as well.

Figure 2A:
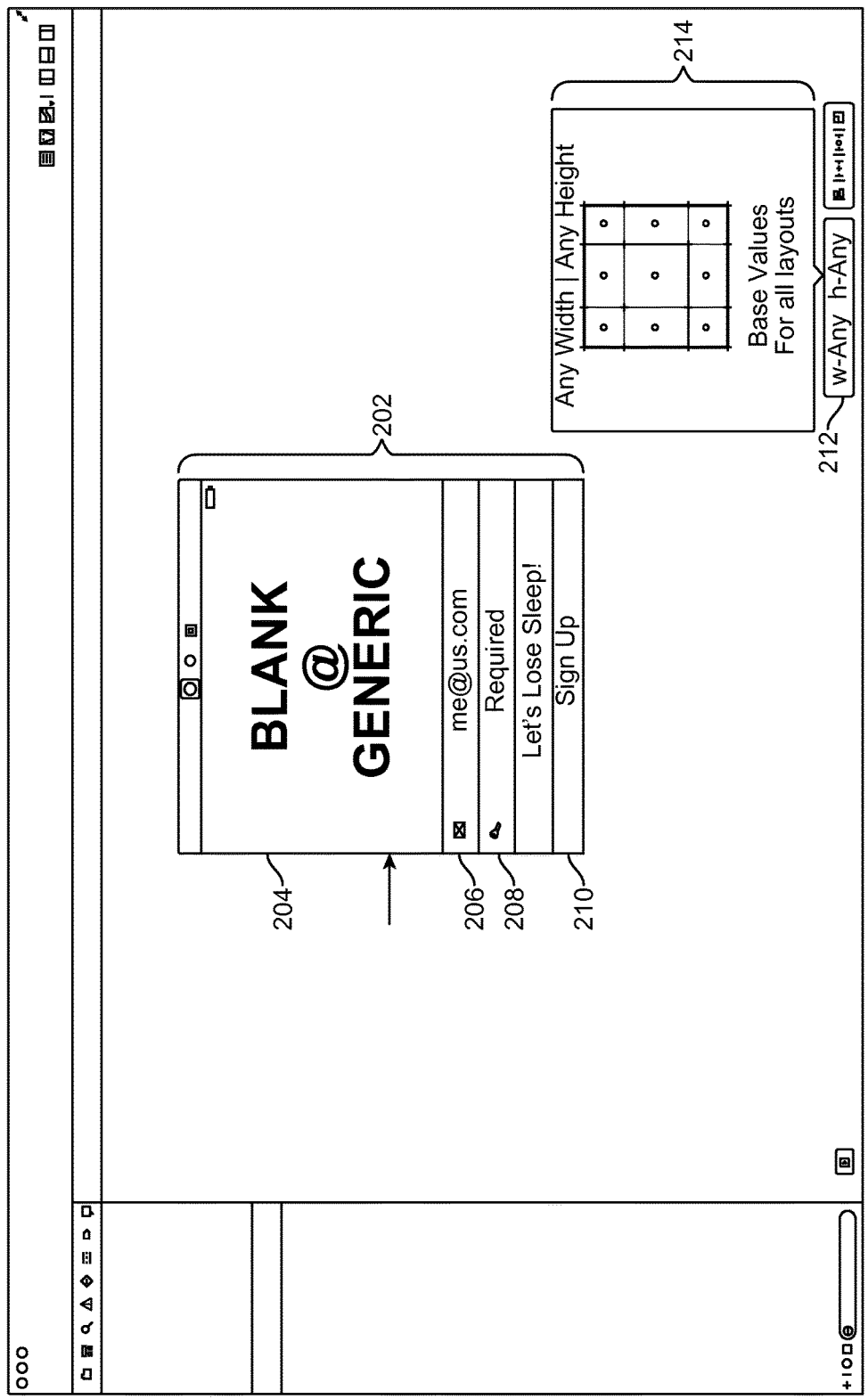
FIG. 2A illustrates an example development environment for allowing an application developer to create and edit an adaptive user interface.

FIG. 2A illustrates an example development environment for allowing an application developer to create and edit an adaptive user interface. FIG. 2A includes user interface 202. User interface 202 includes various fields including text and graphics element 204, email entry element 206, password entry element 208, and sign up execution element 210. Developer user interface 212 indicates that user interface 202 is in the (any, any) configuration and thus will adapt to a device screen with any first abstracted size class value and any second abstracted size class value. In other words, user interface 202 is automatically adaptable to screen sizes of any size. As shown, the first abstracted size class value can relate to an abstracted width value and the second abstracted size class value can relate to an abstracted height value.

Also, GUI 214 allows a developer to graphically select a desired first abstracted size class value or second abstracted size class value for editing. In this example, there are three possible values for each abstracted size class value—any, compact, or regular. Accordingly, user interface 202 can have customized designs that correspond to each combination of abstracted size class values. User interface 202 can then be rendered differently according to the screen dimensions of a device.

In one example, a system performs this automatic adaptation by computing a final position and size of an element from its constraints, which are a collection of relative relationships expressed as linear equations.

In one example of automatic adaptation, a developer might have the constraints: View.right=Container.right−20, View.top=Container.top+20, View.width=100, and View.height=100. If container is 500×500 (in pixels), then View's final position (assuming a flipped coordinate system) would be: x=500−100−20=380, y=0+20=20, width=100, and height=100. The example is only illustrative and those of ordinary skill in the art will recognize other automatic user interface adaptations that can work as well.

As described above, GUI 214 allows a developer to graphically select a desired first abstracted size class value or second abstracted size class value for editing. In this example, there are three possible values for each abstracted size class value—any, compact, or regular. For example, GUI 214 allows a developer to select an (any, any) configuration, a (compact, any) configuration, an (any, compact), a (compact, compact) configuration, a (regular, any), an (any, regular) configuration, a (regular, regular) configure, a (compact, regular) configuration, or a (regular, compact) configuration—thus giving nine possible selections. In an alternative embodiment, if there are four possible values for each abstracted size class value—any, compact, regular, or wide—16 paired values would be possible.

Furthermore, those that are skilled in the art will recognize that the present technology is not limited to a particular number of abstract size class values. A device can be associated with any number of abstract size class values that can be used by a developer to modify the presentation of the application's user interface. In some embodiments, features of a device can be associated with additional variables. For example, the presence of an HDMI input or an HDMI output can be associated with a variable that has a value of "true" or "false." Additional variables can be associated with touch-sensitive displays, the present orientation of the image on the display (landscape or portrait), the present orientation of the device (vertical or horizontal), the brightness level of the display, the ambient lighting of the environment, etc. Furthermore, a particular device can have more than one display that is each associated with its own abstract size class values and variables. In addition, a device can be capable of driving an external display using a hardware interface such as HDMI, which can be associated with a different set of abstract size class values used for displaying the application GUI on an external display. A developer can use each of the abstract size class values and variables to further customize a device application using GUI 214.

Figure 2B:
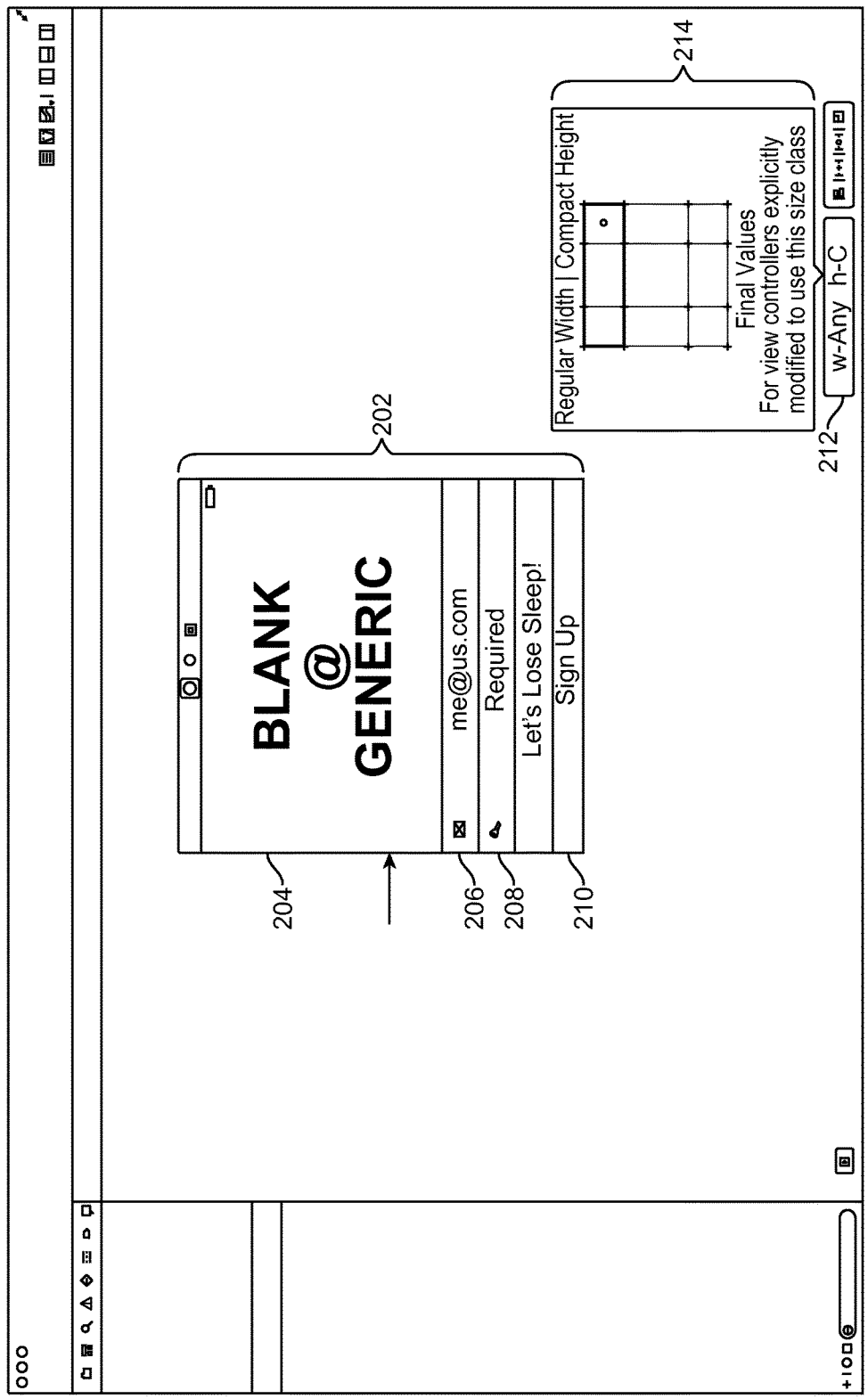
FIG. 2B illustrates the example development environment for allowing an application developer to create and edit an adaptive user interface of FIG. 2A, in which the developer can edit the adaptive user interface for a selected first or second abstracted size class value.

FIG. 2B illustrates the example development environment for allowing an application developer to create and edit an adaptive user interface of FIG. 2A, in which the developer can edit the adaptive user interface for a selected first or second abstracted size class value. FIG. 2B includes the same user interface 202 of FIG. 2A, including various fields including text and graphics element 204, email entry element 206, password entry element 208, and sign up execution element 210. Developer user interface 212 has changed relative to FIG. 2A to indicate that this user interface is now in the (any, compact) configuration and thus will apply to a device screen with any first abstracted size class value and a compact second abstracted size class value. In other words, this user interface applies to a subset of possible user interfaces, and more specifically to user interfaces with the (any, compact) configuration. The user can now make changes to user interface 202, such as adding a slider or some additional functionality that will only apply to device screens with an (any, compact) configuration.

Figure 3:
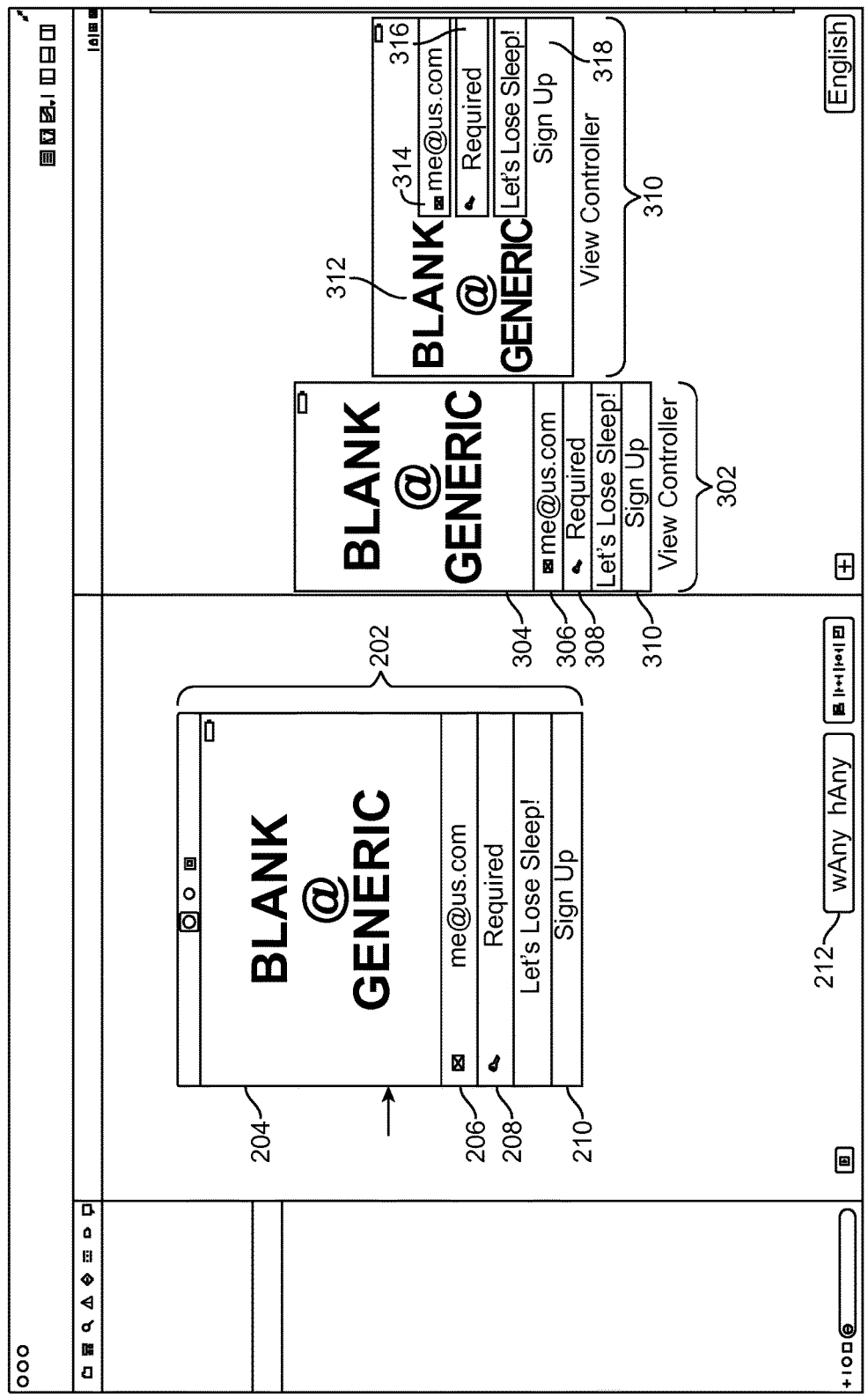
FIG. 3 illustrates the example development environment of FIGS. 2A and 2B, in which the resulting adaptive user interfaces are displayed in multiple destination contexts.

FIG. 3 illustrates the example development environment of FIGS. 2A and 2B, in which the resulting adaptive user interfaces are displayed. FIG. 3 includes the same user interface 202 of FIG. 2A and FIG. 2B, including various fields including text and graphics element 204, email entry element 206, password entry element 208, and sign up execution element 210. Developer user interface 212 is the same as FIG. 2A to indicate that this user interface is now in the (any, any) configuration and thus will apply to a device screen with any first abstracted size class value and any second abstracted size class value.

Graphical user interface 302 shows an output of user interface 202 in a first configuration. The first configuration includes text and graphics element 304, email entry element 306, password entry element 308, and sign up execution element 310. Graphical user interface 310 shows an output of user interface 202 in a second configuration. The second configuration includes text and graphics element 312, email entry element 314, password entry element 316, and sign up execution element 318.

The first configuration associated to graphical user interface 302 can correspond to a user interface in the (compact, any) configuration. Hence, graphical user interface 202 can be rendered according to the first configuration when the device screen has a "compact" width and "any" height. Likewise, the second configuration associated to graphical user interface 310 can correspond to a user interface in the (any, compact) configuration. Hence, graphical user interface 202 can be rendered according to the second configuration when the device screen has "any" width and a "compact" height. Note that in graphical user interface 310, the text and graphics element 312 is positioned differently relative to the other elements to accommodate the screen size.

Although FIG. 3 illustrates a first and a second configuration, those of skill in the art will recognize that the system can display a number of configurations based on the possible abstracted size class values (any, compact, regular, etc.) and the destination environments. For example, the destination environment can correspond to different devices such as different models of mobile smartphones or mobile tablets that can be used in either portrait mode or landscape mode. In addition, the abstract size class values can have change according to the device's orientation in the user's hand. Consequently, each device can have corresponding abstract size class values associated with each mode of operation. Furthermore, this example is merely illustrative and those of skill in the art will recognize that more displayed configurations are possible with the addition of more abstracted size class values. For example, a "wide" abstracted size class value can be added to create four possibly size class values: any, compact, regular, or wide.

In some embodiments, the development environment can allow for further customization based on additional variables. For example, an "HDMI input" variable can be added to further customize the GUI. The "HDMI input" variable can have a value of "true" if the device has an HDMI input or "false" if the device does not have an HDMI input. Consequently, a developer can customize an application GUI based on the presence of an HDMI input on the device. Other variables can include whether the device has a touchscreen display, an HDMI output, an accelerometer, a camera, etc. Those that are skilled in the art will recognize that variables can be associated with any of a device's features to allow further customization of the application's GUI.

Figure 4:
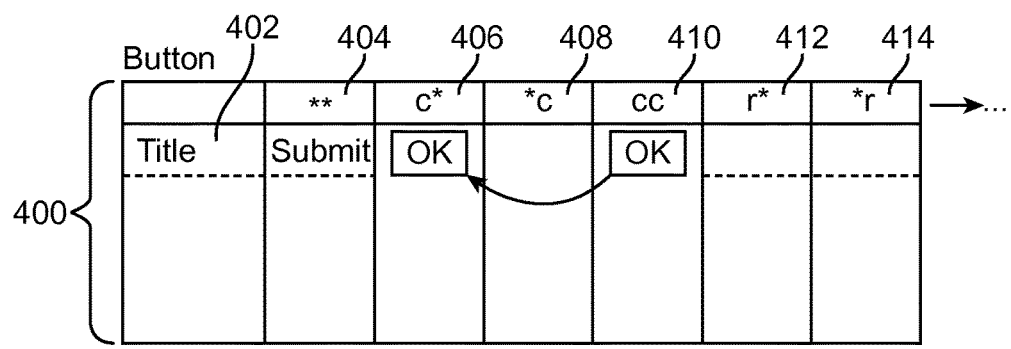
FIG. 4 illustrates an example spreadsheet style user interface that allows a developer to see all versions of an adaptive user interface in a single view and to edit the adaptive user interface for specific devices with selected first or second abstracted size class values.

FIG. 4 illustrates an example spreadsheet style user interface that allows a developer to see all versions of an adaptive user interface in a single view and to edit the adaptive user interface for specific devices with selected first or second abstracted size class values. More specifically, FIG. 4 includes graphical user interface 400. Graphical user interface 400 includes title 402 for a graphical element. Graphical user interface 400 then shows the output of the element in various configurations in a single glance according to the available first abstracted size class value and second abstracted size class value.

Graphical user interface 400 includes column 404 for the (any, any) configuration, column 406 for the (compact, any) configuration, column 408 for the (any, compact) configuration, column 410 for the (compact, compact) configuration, column 412 for the (regular, any) configuration, and column 414 for the (any, regular) configuration. The displayed arrow to the right indicates that further configurations are possible. In this example, the first abstracted size class value relates to width and the second abstracted size class value relates to height, although this is merely a design choice and other implementations are possible.

Graphical item 404 shows how the element will be displayed in the (any, any) configuration, unless a developer has input override instructions for this element in particular cases. As illustrated, a developer has input over ride instructions for the (compact, compact) configuration to display "OK" text in the user interface instead of the longer "Submit" text for the (any, any) configuration. The developer may have made this override instruction after discovering that the "OK" text looks better on compact width screens. However, after further inspection, the developer may discover that the "OK" text would look better in all compact width configurations, not just (compact, compact) configurations. Therefore, the developer has dragged the "OK" text from column 410 to column 406. This results in the system displaying the "OK" text on all displays with a (compact, any) configuration, while in all other configurations, the system will display the "Submit" text. This effectively allows the developer to set a user interface that displays text as "Submit" and then to input over ride instructions that instruct the system to display the text as "Submit" in any configuration, unless the configuration is a (compact, any) configuration, in which case the system will display the text as "OK". In this case the (compact, any) configuration includes the (compact, compact) configuration and (compact, regular) configuration.

Figure 5:
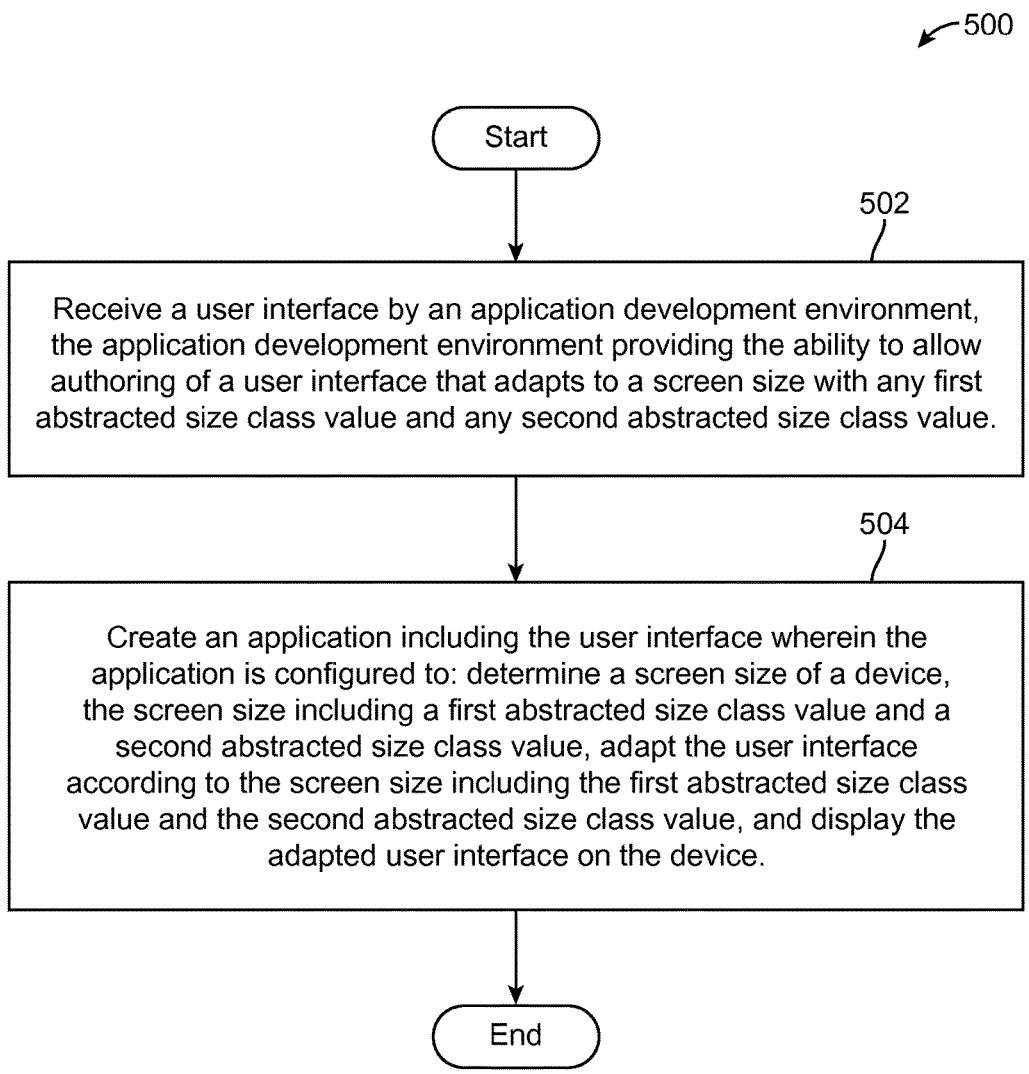
FIG. 5 illustrates an example flowchart for creating and adapting user interfaces according to some aspects of the subject technology.

FIG. 5 illustrates an example flowchart 500 for creating and adapting user interfaces according to some aspects of the subject technology. The example flowchart 500 of FIG. 5 begins at step 502 and includes receiving a user interface by an application development environment, the application development environment providing the ability to allow authoring of a user interface that adapts to a screen size with any first abstracted size class value and any second abstracted size class value.

At step 504, the example method then includes creating an application including the user interface wherein the application is configured to: determine a screen size of a device, the screen size including a first abstracted size class value and a second abstracted size class value, adapt the user interface according to the screen size including the first abstracted size class value and the second abstracted size class value, and display the adapted user interface on the device.

In one aspect, the first abstracted size class value and the second abstracted size class value can correspond to a (compact, compact) configuration. If the particular application includes pre-defined settings for displaying the GUI in a (compact, compact) arrangement, then those settings will be used to adapt the user interface. However, if the particular application does not have a (compact, compact) arrangement defined, then the user interface can be adapted to use another applicable configuration such as (any, compact), (compact, any), or (any, any). In some embodiments, when an application does not have the particular device arrangement defined, an appropriate arrangement can be selected by searching from the more specific defined configurations to the most general defined configurations. Consequently, the (any, any) configuration can be selected as a default option when no other matching configurations are available.

In one aspect the example method can further include creating instructions to override the adapted user interface with a modified user interface wherein the determined screen size of the device includes a first predetermined abstracted size class value and displaying the modified user interface on the device, wherein the determining the screen size of the device includes determining that the screen size includes the first predetermined abstracted size class value. The instructions to override the displayed user interface with the modified user interface can include instructions to change color, text, element location, or removing of an element. For example, the border color of a specific layer can be changed or the alignment of text (left, right, centered, justified) located on a label. Those that are skilled in the art will recognize that the disclosed technology can be used to modify any property that is associated with an object. In another variation, the user interface can include a multi-pane interface and the override instructions can only apply to one pane within the multi-pane interface.

In one variation of the example method, the first abstracted size class value or the second abstracted size class value is defined as a compact or regular abstracted size class value.

In another variation of the example method, the first abstracted size class value is a width of the screen and the second abstracted size class value is a height of the screen.

In another variation of the example method, the first abstracted size class value and second abstracted size class value define a circular screen size.

Figure 6A:
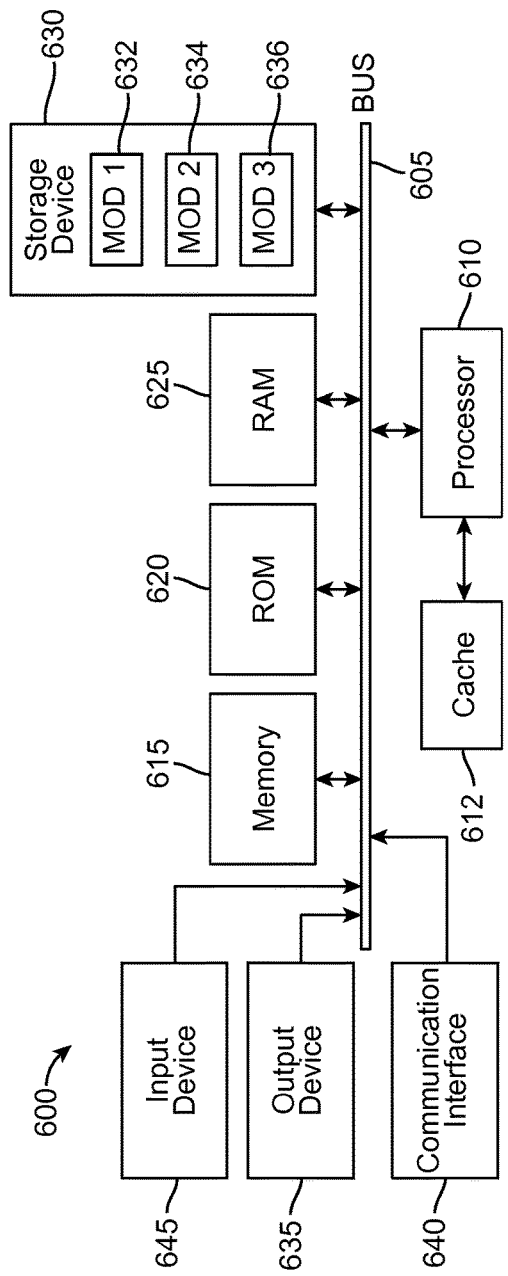
FIG. 6A and FIG. 6B illustrate example system embodiments for creating and/or editing adaptive user interfaces according to the disclosed technology.
Figure 6B:
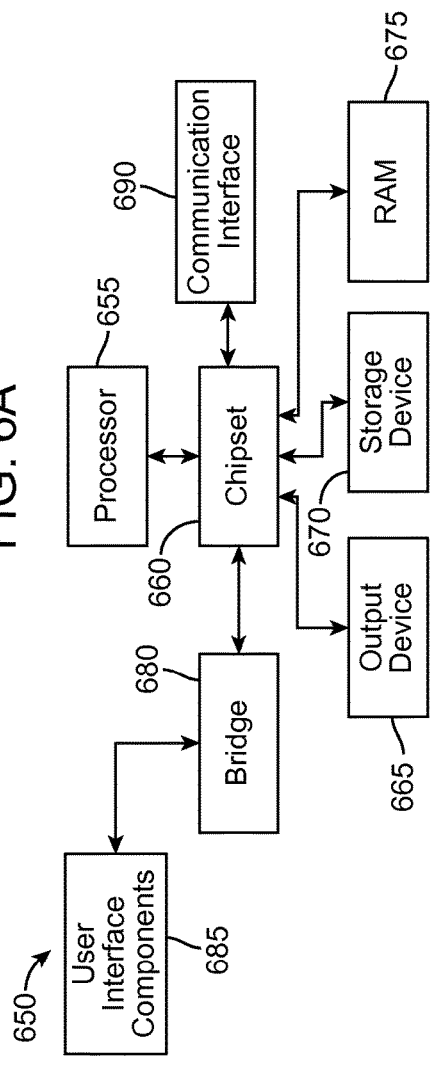

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A computer-implemented method comprising:
receiving a user interface by an application development environment, the application development environment providing an ability to allow authoring of a user interface that adapts to a screen size with any first abstracted size class value and any second abstracted size class value;
creating an application including the user interface, wherein creating the application includes:
receiving, by a tool displayed within the application development environment, a graphical selection of a first abstracted size class value corresponding to a width of the user interface and a second abstracted size class value corresponding to a height of the user interface from a predefined set of abstracted size class values provided by the tool, wherein the application is configured to:
determine a screen size of a device, the screen size including a width corresponding to the first abstracted size class value and a height corresponding to the second abstracted size class value;
adapt the user interface according to the screen size; and
display the adapted user interface on the device.

2. The computer-implemented method of claim 1, wherein creating the application further includes:
specifying a second user interface element as an override to a first user interface element of the user interface, wherein when the screen size does not support at least one of the selected first abstracted size class value or the selected second abstracted size class value, the user interface is adapted to override the first user interface element with the second user interface element.

3. The computer-implemented method of claim 2, wherein the second user interface element modifies at least one of color, text, or location of the first user interface element.

4. The computer-implemented method of claim 2, wherein the user interface includes a multi-pane interface and overriding the first user interface element with the second user interface element applies only to one pane within the multi-pane interface.

5. The computer-implemented method of claim 1, wherein the first abstracted size class value or the second abstracted size class value is defined as a compact or regular abstracted size class value.

6. The computer-implemented method of claim 1, wherein the first abstracted size class value and second abstracted size class value define a circular screen size.

7. A system comprising:
a processor;
a computer-readable storage medium having stored therein instructions which, when executed by the processor, cause the processor to perform operations comprising:
receiving a user interface by an application development environment, the application development environment providing the ability to allow authoring of a user interface that adapts to a screen size with any first abstracted size class value and any second abstracted size class value;
creating an application including the user interface, wherein creating the application includes:
receiving, by a tool displayed within the application development environment, a graphical selection of a first abstracted size class value corresponding to a width of the user interface and a second abstracted size class value corresponding to a height of the user interface from a predefined set of abstracted size class values provided by the tool, wherein the application is configured to:
determine a screen size of a device, the screen size including a width corresponding to the first abstracted size class value and a height corresponding to the second abstracted size class value;
adapt the user interface according to the screen size; and
display the adapted user interface on the device.

8. The system of claim 7, the operations to create the application further including:
specifying a second user interface element as an override to a first user interface element of the user interface, wherein when the screen size does not support at least one of the selected first abstracted size class value or the selected second abstracted size class value, the user interface is adapted to override the first user interface element with the second user interface element.

9. The system of claim 8, wherein the second user interface element modifies at least one of color, text, or location of the first user interface element.

10. The system of claim 8, wherein the user interface includes a multi-pane interface and overriding the first user interface element with the second user interface element applies only to one pane within the multi-pane interface.

11. The system of claim 7, wherein the first abstracted size class value or the second abstracted size class value is defined as a compact or regular abstracted size class value.

12. A non-transitory computer-readable storage medium having stored therein instructions which, when executed by a processor, cause the processor to perform operations comprising:
receiving a user interface by an application development environment, the application development environment providing the ability to allow authoring of a user interface that adapts to a screen size with any first abstracted size class value and any second abstracted size class value;
creating an application including the user interface, wherein creating the application includes:
receiving, by a tool displayed within the application development environment, a graphical selection of a first abstracted size class value corresponding to a width of the user interface and a second abstracted size class value corresponding to a height of the user interface from a predefined set of abstracted size class values provided by the tool, wherein the application is configured to:
determine a screen size of a device, the screen size including a width corresponding to the first abstracted size class value and a height corresponding to the second abstracted size class value;
adapt the user interface according to the screen size; and
display the adapted user interface on the device.

13. The non-transitory computer-readable storage medium of claim 12, the operations further comprising:
specifying a second user interface element as an override to a first user interface element of the user interface, wherein when the screen size does not support at least one of the selected first abstracted size class value or the selected second abstracted size class value, the user interface is adapted to override the first user interface element with the second user interface element.

14. The non-transitory computer-readable storage medium of claim 13, wherein the second user interface element modifies at least one of color, text, or location of the first user interface element.

15. The non-transitory computer-readable storage medium of claim 13, wherein the user interface includes a multi-pane interface and overriding the first user interface element with the second user interface element applies only to one pane within the multi-pane interface.

16. The non-transitory computer-readable storage medium of claim 12, wherein the first abstracted size class value or the second abstracted size class value is defined as a compact or regular abstracted size class value.

17. The non-transitory computer-readable storage medium of claim 12, wherein the first abstracted size class value and second abstracted size class value define a circular screen size.

18. The computer-implemented method of claim 1, wherein the tool displays a selectable grid as a graphical representation of the user interface displayed within the application development environment.

19. The computer-implemented method of claim 2, wherein the first user interface element and the second user interface element are buttons with text, wherein a number of characters in the second user interface element is less than the number of characters in the first user interface element.

20. The computer-implemented method of claim 18, wherein the selectable components of the grid correspond to the predefined set of abstracted size class values provided by the tool.

21. The computer-implemented method of claim 1, wherein creating the application further includes:
providing, within the application development environment, a preview display of the user interface, and wherein the tool is displayed concurrently with the preview display.

* * * * *